J. MOLTASCH.
BAKER'S OVEN.
APPLICATION FILED APR. 9, 1919.

1,322,928.

Patented Nov. 25, 1919.
2 SHEETS—SHEET 1.

Inventor
John Moltasch
By his Attorney
Oscar Geier

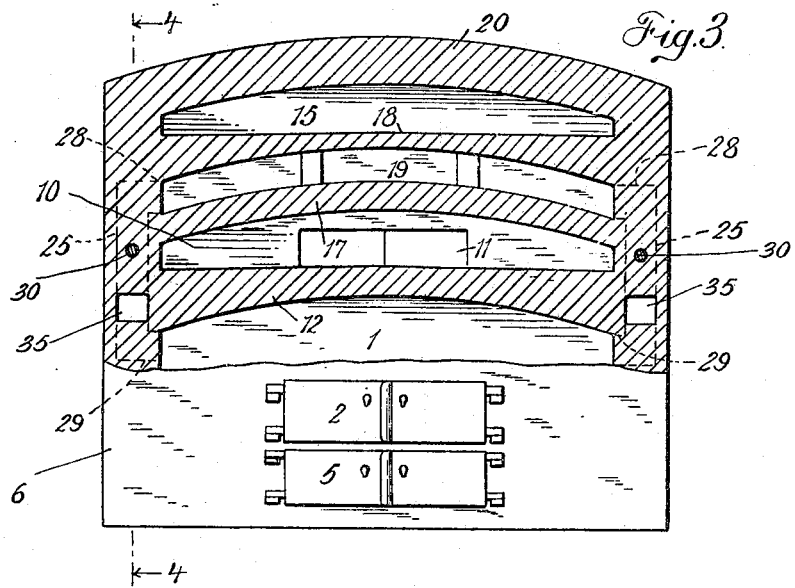
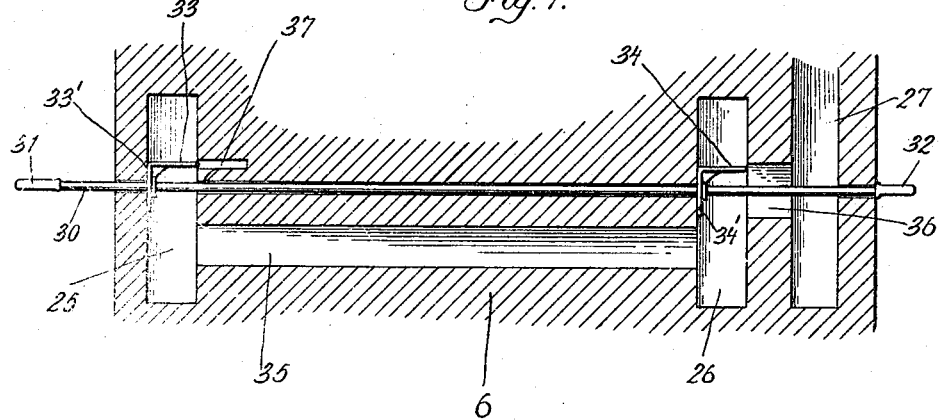

UNITED STATES PATENT OFFICE.

JOHN MOLTASCH, OF MERIDEN, CONNECTICUT.

BAKER'S OVEN.

1,322,928.　　　　Specification of Letters Patent.　　Patented Nov. 25, 1919.

Application filed April 9, 1919.　Serial No. 288,693.

*To all whom it may concern:*

Be it known that I, JOHN MOLTASCH, a citizen of Austria, residing at Meriden, county of New Haven, and State of Connecticut, have invented certain new and useful Improvements in Bakers' Ovens, of which the following is a specification.

This invention relates to bakers' ovens and it has for an object to produce a new and improved type of baker's oven which can be used simultaneously in baking both bread and cake and without the bread and cake bakers interfering with one another.

A further object is to provide for the proper distribution of heat to the bread and cake ovens.

For further comprehension of the invention, and of the objects and advantages thereof, reference will be had to the following description and accompanying drawings, and to the appended claims in which the various novel features of the invention are more particularly set forth.

Figure 1 of the drawings is a longitudinal sectional view partly in elevation of a baker's oven constructed according to my invention.

Fig. 3 is a part end elevation and part transverse vertical section on the line 3—3 of Fig. 1.

Fig. 4 is a fragmentary longitudinal vertical section taken on the line 4—4 of Fig. 2, and illustrating particularly the flues leading to the cake oven and the dampers controlling them.

Figure 1:
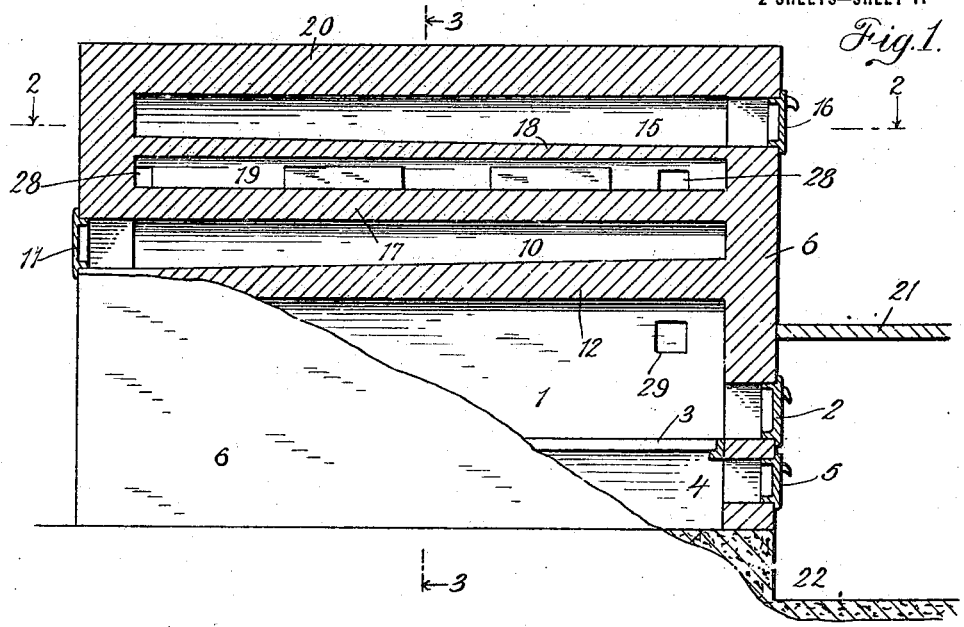
Figure 2:
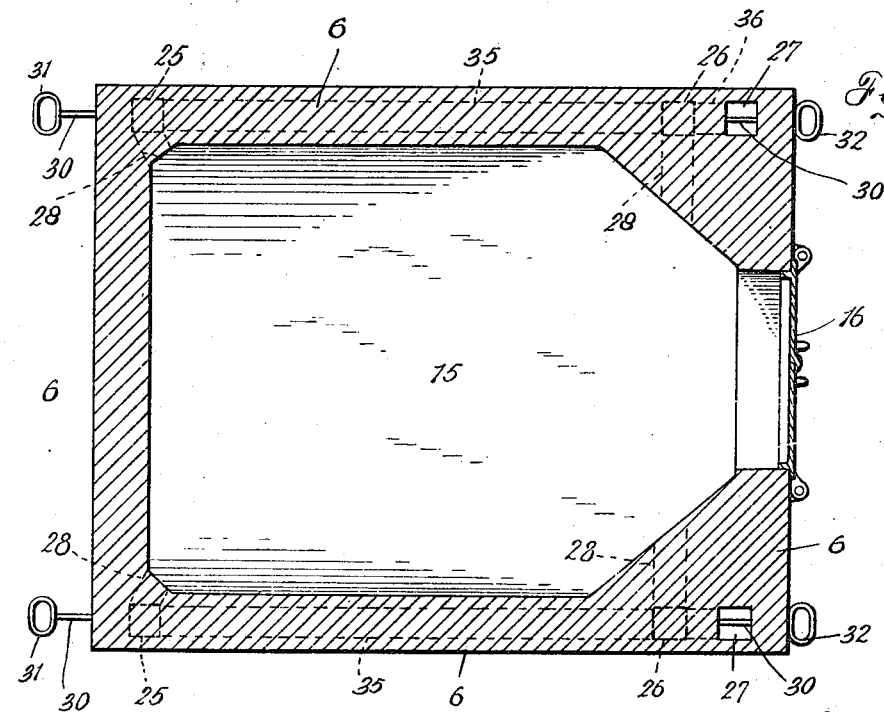
Fig. 2 is a horizontal section on the line 2—2 of Fig. 1.

My improved oven comprises the fire chamber 1 provided with the usual doors 2 at one end; 3 indicating the grate bars, 4 the ash pit, and 5 the doors leading to the latter, the walls of the oven being constructed in the usual manner and indicated by the numeral 6. The walls may be formed with the usual heat insulating spaces (not shown).

Above the fire chamber is located the bread oven 10 having a door 11 at one end, this being preferably the end opposite the fire doors 2.

The floor 12 of the bread oven preferably inclines upwardly toward the rear, as shown in Fig. 1, and is of arched shape in transverse section, as shown in Fig. 3, and may be made of the usual material.

Above the bread oven 10 I provide the cake oven 15 having a door 16 at the end opposite to the door 11. Between the roof 17 of the bread oven and the floor 18 of the cake oven is a space 19 to receive the hot gases from the fire chamber to heat the oven.

The floor of the cake oven may incline upwardly from the door 16, this inclination of course being opposite to that of the floor 12 while the same arched formation in transverse section is provided. The roof 20 of the cake oven forms the roof of the oven. To enable the cake baker to easily reach the door 16 of the cake oven a raised platform 21 may be provided at this end of the oven upon which the cake baker may work, while a depression 22 may be provided in the floor under the platform to permit of convenient access to the doors 2 and 5 which lead to the fire chamber and ash pit.

To heat the cake oven a series of passages or flues are provided which lead from the fire chambers to the space 19. I prefer to provide four of these flues which extend vertically up through the walls one in each corner of the oven, flues at one end being numbered 25 and those at the other end being numbered 26, the flues 26 being adjacent the usual chimney flues 27 as shown. As indicated most clearly in Fig. 3 these flues have horizontal offsets, 28 and 29 respectively, at their upper and lower ends which open into the space 19 and the fire chamber 1.

In order to enable the heat to the cake oven to be properly regulated, I provide a damper mechanism by which these flues can be cut off from the space 19 and opened to the chimney flues 27. As here shown this damper mechanism comprises a pair of rods 30 which extend slidably through the side walls of the oven from end to end of the latter and have their projecting ends provided with handles 31 and 32, the handle on the bread baker's end being omitted if desired since the damper mechanism is intended for regulating the cake oven only.

These rods pass through the flues 25, 26 and 27 and have each fixed thereon a pair of angular dampers located in the flues 25 and 26, the damper in the flue 25 comprising the horizontal member 33 and vertical member 33', and the damper in the flue 26 comprising the horizontal member 34 and the vertical member 34'.

Connecting the flues 25 and 26 at a point below the dampers are passages 35, while the flues 26 are connected with the chimney flues 27 and by passages 36 which are in juxtaposition to the damper members 34' as shown adapted to close the latter. These passages receive the damper members 34 when the dampers are moved to open the flues 25 and 26 as will be apparent. Recesses 37 may be formed in the oven wall adjacent the damper members 33 to receive the latter when the dampers are moved to open the flues 25 and 26.

In the position shown in Fig. 4 the flues are closed by the horizontal damper members 33 and 34 while communication to the chimney flues is open. It will be apparent that when the rods 30 are pulled to the right the flues 25 and 26 will be open while the vertical damper members 34' will close the entrance to the passages 35 and 36.

If desired I may reverse the position of the damper in the flue 26 so as to cause a flow of the hot gases up flue 25 along space 19 and through the passage 36 to the chimney flue 27.

As will be apparent I have provided a baker's oven in which bread baking and cake baking may be simultaneously carried on without inconvenience, the necessity for night shifts, or alternating shifts, being thus avoided, and in which the proper regulation of heat for the cake oven may be effected independently of the usual heat regulating means with which the oven may be provided as desired.

It will be apparent that various changes and modification might be made in the construction here set forth and the right is reserved to all changes and modifications coming within the scope of the appended claims.

What I claim and desire to protect by Letters Patent of the United States is as follows:

1. A baker's oven comprising a fire chamber, a bread oven above said fire chamber, a cake oven above and spaced from said bread oven, the walls of the oven being provided with chimney flues from the fire chamber and with oven flues leading from the fire chamber to the space below the cake oven, and a unitary damper mechanism whereby the oven flues may be opened to communication either with the said space or the said chimney flues.

2. A baker's oven comprising a fire chamber, a bread oven above said fire chamber, a cake oven above and spaced from said bread oven, the walls of the oven being provided with the chimney flues from the fire chamber and with oven flues leading from the fire chamber to the space below the cake oven, and a unitary damper mechanism whereby the oven flues may be opened to communication either with the said space or the said chimney flues, said mechanism including a slidable rod, and an angular damper carried thereby.

3. A baker's oven comprising a fire chamber a bread oven above said fire chamber, a cake oven above and spaced from said bread oven, a pair of oven flues at both the front and rear end of the oven leading from the fire chamber to the space below the cake oven, chimney flues adjacent the front pair of said oven flues, rods extending longitudinally through the side walls of the oven and intersecting all of said flues, and angular damper members carried by said rods and having one leaf adapted to at times extend across the front oven flue and another leaf adapted to at other times close the said passage from the front oven flue to the adjacent chimney flue.

In testimony whereof I have affixed my signature.

JOHN MOLTASCH.